United States Patent
Liu et al.

(10) Patent No.: US 12,436,808 B2
(45) Date of Patent: Oct. 7, 2025

(54) CPU TIGHT-COUPLED ACCELERATOR

(71) Applicant: Samsung Electronics Co., Ltd., Suwon-si (KR)

(72) Inventors: Zhi-Gang Liu, Westford, MA (US); Jun Woo Jang, Santa Clara, CA (US); Sehwan Lee, Seongnam-si (KR); Dongkyun Kim, Fremont, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 108 days.

(21) Appl. No.: 18/225,041

(22) Filed: Jul. 21, 2023

(65) Prior Publication Data

US 2024/0411599 A1 Dec. 12, 2024

Related U.S. Application Data

(60) Provisional application No. 63/471,443, filed on Jun. 6, 2023.

(51) Int. Cl.
*G06F 9/48* (2006.01)
*G06F 9/50* (2006.01)

(52) U.S. Cl.
CPC .......... *G06F 9/5027* (2013.01); *G06F 9/4881* (2013.01)

(58) Field of Classification Search
CPC .................................................. G06F 9/4881
See application file for complete search history.

(56) References Cited

U.S. PATENT DOCUMENTS

| | | | |
|---|---|---|---|
| 10,838,864 B2 | 11/2020 | Boyer et al. | |
| 11,037,050 B2 | 6/2021 | Vinod et al. | |
| 11,307,873 B2 | 4/2022 | Halpern et al. | |
| 11,416,281 B2 | 8/2022 | Sankaran et al. | |
| 11,487,585 B1 * | 11/2022 | Gilliland | G06F 9/5044 |
| 2019/0303159 A1 | 10/2019 | Fryman et al. | |
| 2019/0384370 A1 * | 12/2019 | Kim | G06N 3/065 |
| 2020/0334079 A1 * | 10/2020 | Zhao | G06F 9/4881 |
| 2021/0073612 A1 | 3/2021 | Vahdat et al. | |
| 2021/0109679 A1 * | 4/2021 | Guim | G06F 3/0604 |
| 2022/0113915 A1 | 4/2022 | Ki et al. | |
| 2022/0114015 A1 | 4/2022 | Lee et al. | |
| 2022/0365782 A1 | 11/2022 | Wang et al. | |
| 2022/0377615 A1 * | 11/2022 | Radunovic | G06F 11/3428 |
| 2022/0405221 A1 | 12/2022 | Wang et al. | |

OTHER PUBLICATIONS

Xiao, Yao, et al., "Self-Optimizing and Self-Programming Computing Systems: A Combined Compiler, Complex Networks, and Machine Learning Approach," IEEE Transactions on Very Large Scale Integration (VLSI) Systems, IEEE, vol. 27, No. 6, Jun. 2019, pp. 1416-1427.

* cited by examiner

*Primary Examiner* — Michael J Metzger
(74) *Attorney, Agent, or Firm* — Lewis Roca Rothgerber Christie LLP

(57) ABSTRACT

An integrated circuit includes: a central processing unit (CPU) core; an accelerator; and an acceleration instruction queue connected to the CPU core and the accelerator. The CPU core is to: fetch and decode one or more instructions from among an instruction sequence in a programmed order; determine an instruction from among the one or more instructions containing an acceleration workload encoded therein; and queue the instruction containing the acceleration workload encoded therein in the acceleration instruction queue.

19 Claims, 10 Drawing Sheets

TMFA T$_1$, V$_1$, V$_2$
Compute matrix product for V$_1$ and V$_2$
V$_1$, V$_2$ are vector registers of CPU
T$_1$ is one tensor register in TRF
Attributes:
    .F32.32 encodes for FP32 operand and result data type
    .F8.32  for FP8 operands and FP32 results
    .B16.32 for BF8 operands and FP32 results
    .F16.32 for FP16 operands and FP32 results
    .F32.64 for FP32 operands and FP64 results
    .F64.64 for FP64 operands and FP64 results

FIG. 7

CPU TIGHT-COUPLED ACCELERATOR

CROSS-REFERENCE TO RELATED APPLICATION(S)

This application claims priority to and the benefit of U.S. Provisional Application No. 63/471,443, filed on Jun. 6, 2023, entitled "CPU TIGHT-COUPLED NEURAL NETWORK ACCELERATOR," the entire content of which is incorporated by reference herein.

BACKGROUND

1. Field

Aspects of embodiments of the present disclosure relate to an accelerator, and more particularly, to an accelerator tightly coupled to a central processing unit (CPU) core.

2. Description of Related Art

Machine learning typically involves training and inference as two main phases. During training, a developer trains a neural network model using a curated dataset, so that the neural network model can learn whatever it can about the data it will analyze in order to make suitable predictions. Once sufficiently trained, the neural network model can make predictions during inference based on real live data. Because neural network models are typically required to compute large amounts of data during training and inference, they may demand processors having high computing capacity, power efficiency, and programmability.

The above information disclosed in this Background section is for enhancement of understanding of the background of the present disclosure, and therefore, it may contain information that does not constitute prior art.

SUMMARY

Embodiments of the present disclosure are directed to systems and methods including an accelerator that is tightly coupled to a CPU core.

According to one or more embodiments of the present disclosure, an integrated circuit includes: a central processing unit (CPU) core; an accelerator; and an acceleration instruction queue connected to the CPU core and the accelerator. The CPU core is configured to: fetch and decode one or more instructions from among an instruction sequence in a programmed order; determine an instruction from among the one or more instructions containing an acceleration workload encoded therein; and queue the instruction containing the acceleration workload encoded therein in the acceleration instruction queue.

In an embodiment, the accelerator may be configured to: dequeue the instruction containing the acceleration workload from the acceleration instruction queue; receive operands associated with the acceleration workload from scratch memory of the CPU core; and compute a result based on the operands and the dequeued instruction.

In an embodiment, the accelerator may be configured to dequeue instructions from the acceleration instruction queue in a first-in-first-out method.

In an embodiment, the accelerator may be further configured to store the result in embedded memory of the accelerator.

In an embodiment, the CPU core, the accelerator, the scratch memory, and the embedded memory may be integrated on the same chip as each other.

In an embodiment, the CPU core may be configured to retrieve the result from the embedded memory of the accelerator, and store the result in the scratch memory of the CPU core.

In an embodiment, the accelerator instruction queue may include a plurality of instruction queues defining different priorities from each other for the accelerator.

According to one or more embodiments of the present disclosure, a computing system includes: an accelerator; one or more processors integrated with the accelerator in the same integrated circuit; and memory including instructions stored thereon that, when executed by the one or more processors, cause the one or more processors to: identify a programmed order for executing one or more CPU instructions; and execute the one or more CPU instructions according to the programmed order. To execute the one or more CPU instructions, the instructions cause the one or more processors to: fetch and decode a first instruction in the programmed order from among the one or more CPU instructions; and dispatch the decoded first instruction to a CPU data path or an accelerator data path from among a CPU pipeline based on an instruction type of the first instruction.

In an embodiment, the first instruction may include an accelerator workload encoded therein to be dispatched to the accelerator data path, and the instructions may further cause the one or more processors to: enqueue the first instruction in an acceleration instruction queue; and provide corresponding operands to the accelerator for compute based on the first instruction.

In an embodiment, the accelerator may be configured to: dequeue the first instruction from the acceleration instruction queue; compute a result based on the corresponding operands and the first instruction dequeued from the acceleration instruction queue; and store the result in embedded memory of the accelerator.

In an embodiment, the accelerator may be configured to dequeue instructions from the acceleration instruction queue in a first-in-first-out method.

In an embodiment, the instructions may further cause the one or more processors to: retrieve the result from the embedded memory of the accelerator; and store the result in scratch memory.

In an embodiment, the accelerator, the one or more processors, the embedded memory, and the scratch memory may be integrated in the same integrated circuit.

In an embodiment, the first instruction may be dispatched to the CPU data path, and the instructions may further cause the one or more processor to: fetch and decode a second instruction in the programmed order from among the one or more CPU instructions; determine an acceleration workload encoded in the second instruction; enqueue the second instruction in an acceleration instruction queue; and provide corresponding operands to the accelerator for compute based on the second instruction.

According to one or more embodiments of the present disclosure, a method for accelerating instructions, includes: identifying, by one or more processors, a programmed order for executing one or more instructions; determining, by the one or more processors, an acceleration workload encoded in an instruction of the one or more instructions in the programmed order; and dispatching, by the one or more processors, the instruction to an accelerator data path from among a plurality of data paths of a CPU pipeline based on the determining that the acceleration workload is encoded in the instruction.

In an embodiment, the dispatching may include: enqueuing, by the one or more processors, the instruction in an acceleration instruction queue; and providing, by the one or more processors, corresponding operands to the accelerator data path for compute based on the instruction.

In an embodiment, the accelerator data path may include an accelerator integrated with the one or more processors in the same integrated circuit, and the method may further include: dequeuing, by the accelerator, the instruction from the acceleration instruction queue; computing, by the accelerator, a result based on the corresponding operands and the instruction dequeued from the acceleration instruction queue; and storing, by the accelerator, the result in embedded memory of the accelerator.

In an embodiment, the accelerator may be configured to dequeue instructions from the acceleration instruction queue in a first-in-first-out method.

In an embodiment, the method may further include: retrieving, by the one or more processors, the result from the embedded memory of the accelerator; and storing, by the one or more processors, the result in scratch memory of the one or more processors.

In an embodiment, the accelerator and the one or more processors may be co-processors or multi-processors of the same integrated circuit.

BRIEF DESCRIPTION OF THE DRAWINGS

The above and other aspects and features of the present disclosure will be more clearly understood from the following detailed description of the illustrative, non-limiting embodiments with reference to the accompanying drawings, in which:

FIG. 7 illustrates example instructions for acceleration according to one or more embodiments of the present disclosure;

DETAILED DESCRIPTION

Figure 1:
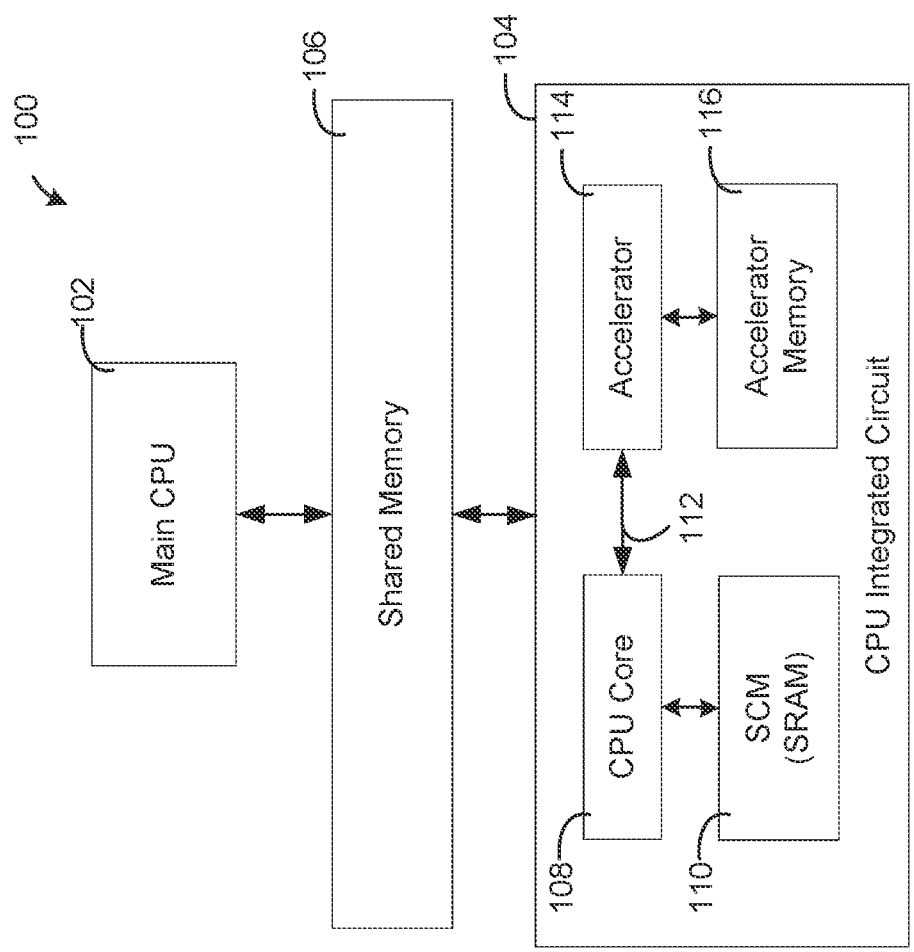
FIG. 1 is a schematic block diagram of a computing system according to one or more embodiments of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Neural network training and inference may demand high computing capacity, power efficiency, and programmability. However, for typical artificial intelligence/machine learning (AI/ML) workloads, traditional microprocessor/CPU architectures may not provide enough computing capacity or power efficiency. On the other hand, typical graphics processing unit (GPU) architectures and custom-designed neural processing unit (NPU) architectures may each suffer from programmability-often requiring complicated software stacks and heterogeneous programming models.

One or more embodiments of the present disclosure may relate to a CPU instruction-based neural network accelerator having high computing capacity, programmability, and power efficiency, for example, such as for model training and/or inference. For example, in some embodiments, a neural network acceleration engine may be integrated with a general-purpose CPU core, and may be invoked as needed or desired for acceleration workloads, which may allow the CPU core to perform other tasks concurrently or substantially simultaneously therewith.

In some embodiments, the acceleration engine may be integrated into the CPU data-path to be invoked for the acceleration workloads. For example, in some embodiments, the acceleration workload may be compiled into the CPU instructions sequence, and dispatched to the acceleration data path as needed or desired. As such, the acceleration data path may provide a different or separate data path for a CPU pipeline to handle the acceleration workload, in addition to typical data paths (e.g., scalar data path, vector data path, memory data path, and the like) of the CPU pipeline for the CPU core, and may be called (e.g., invoked) as needed or desired while having minimal impact to the CPU core and the operations and processes thereof. For example, the acceleration data path may only be invoked for those CPU instructions of the CPU instruction sequence that includes the acceleration workload, and may not be invoked for other CPU instructions of the CPU instruction sequence that include other typical CPU workloads (e.g., scalar workloads, vector workloads, memory workloads, and the like).

In some embodiments, intermediate results (e.g., intermediate or partial outputs) of the acceleration data path may be saved in memory or storage, for example, such as a register file, embedded in the acceleration data path, and thus, the results of the acceleration data path may be stored separately from the memory or storage of the CPU core and may be retrieved by (e.g., read by or sent to) the CPU core as needed or desired. In some embodiments, the intermediate or partial outputs of the acceleration data path may first be temporarily accumulated in an accumulation buffer during multiple cycles or stages of the acceleration data path, and at a final cycle or stage of the acceleration data path, the results may be committed to the embedded memory or storage. Accordingly, inputs/outputs (I/O) transferred between processing elements of the acceleration data path and the embedded memory or storage may be reduced, for example, such as during computation for the acceleration workloads over multiple cycles or stages of the acceleration data path, and read-after-write (RAW) data hazards of the intermediate results during computation over the multiple cycles or stages may be reduced.

In some embodiments, the acceleration engine may be integrated with a plurality of CPU cores, such that each of the plurality of CPU cores may invoke the acceleration engine as needed or desired. For example, in some embodiments, the acceleration engine may be configured for parallel processing, such that the acceleration engine may compute or handle acceleration workloads from two or more CPU cores concurrently or substantially simultaneously. Accordingly, utilization of the acceleration engine may be increased, for example, such as in a case where a single CPU core may not be able to fully utilize the capabilities and/or bandwidth of the acceleration engine.

The above and other aspects and features of the present disclosure will now be described in more detail below with reference to the drawings. While some embodiments of the present disclosure are described in the context of AI/ML neural networks, the present disclosure is not limited thereto, and the CPU/accelerator architecture according to one or more embodiments of the present disclosure may be applicable to any suitable system or network that might benefit from an accelerator tightly coupled to a CPU as described herein.

FIG. 1 is a schematic block diagram of a computing system according to one or more embodiments of the present disclosure.

First, referring to FIG. 1, a computing system 100 may include a main CPU 102, a CPU integrated circuit 104, and shared memory 106. The CPU integrated circuit 104 may be a processing circuit including, for example, a digital circuit (e.g., a microcontroller, a microprocessor, a digital signal processor (DSP), a field programmable gate array (FPGA), an application-specific integrated circuit (ASIC), and/or the like). The CPU integrated circuit 104 may be, for example, a system-on-chip (SOC) including one or more CPU cores 108, scratch memory (SCM) 110, and a tightly-coupled (e.g., integrated) accelerator 114 including accelerator memory 116. As used herein, the term "tightly-coupled" may mean that the accelerator 114 is integrated together with the one or more CPU cores 108 on the same chip. In other words, in some embodiments, the CPU core 108, the accelerator 114, the SCM 110, and the accelerator memory 116 may be included on the same chip and/or in the same package as each other.

The main CPU 102, the CPU core 108, and the accelerator 114 may each be implemented with a general-purpose processor, an ASIC, one or more FPGAs, a DSP, a group of processing components, or other suitable electronic processing components capable of executing instructions (e.g., via firmware and/or software). The main CPU 102 may be responsible for main CPU functions and operations, for example, such as running applications and operating system (OS) functions and operations. The CPU core 108 may support the main CPU 102 with specialized operations and functions, for example, such as arithmetic operations and calculations. The accelerator 114 may support the CPU core 108 with acceleration operations, for example, such as tensor operations (e.g., tensor multiply). In other words, in some embodiments, the CPU core 108 and the accelerator 114 may be understood as co-processors or multi-processors of the same CPU integrated circuit 104. For example, in some embodiments, the accelerator 114 may essentially be understood as a collection of a plurality of multiplication and accumulation (MAC) units and associated storage registers (e.g., accelerator memory 116), such that the accelerator 114 may form a large register file (e.g., see TRF in FIG. 5). The accelerator 114 and the operations thereof will be described in more detail below.

Figure 2A:
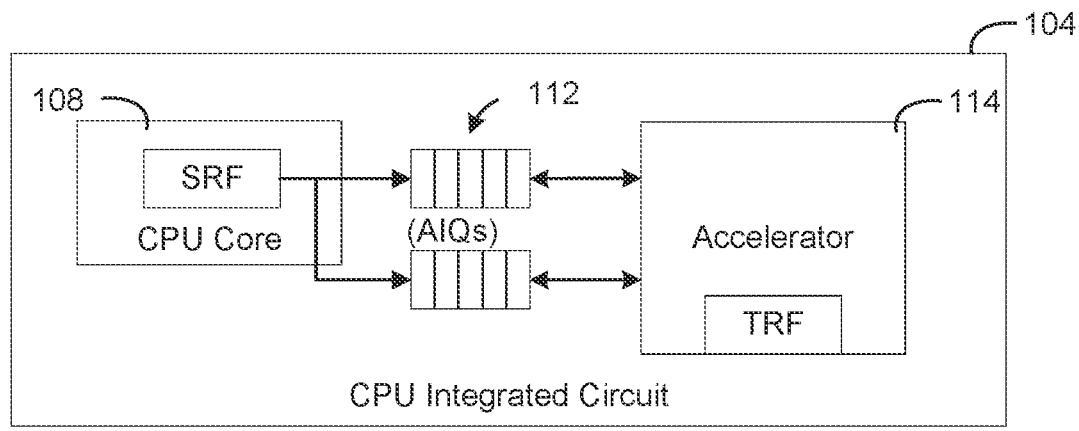
FIGS. 2A and 2B are schematic block diagrams of a CPU integrated circuit according to one or more embodiments of the present disclosure.
Figure 2B:
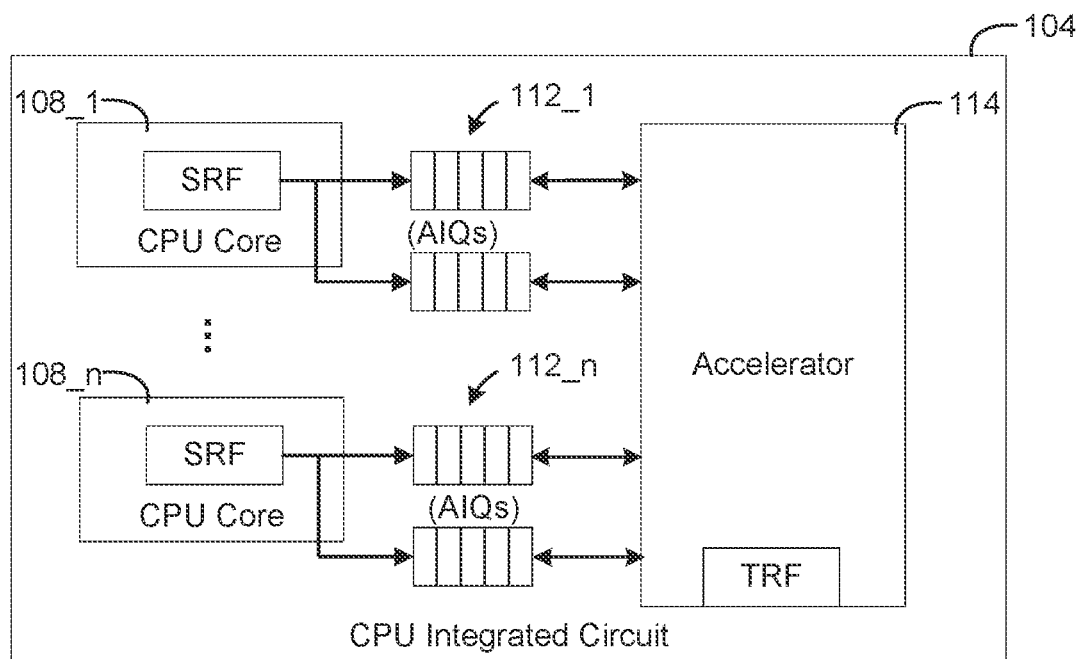

While FIG. 1 shows the main CPU 102 outside of the CPU integrated circuit 104, the present disclosure is not limited thereto. In other embodiments, the main CPU 102 may be a CPU core included in (e.g., integrated into) the integrated circuit 104 with the accelerator 114 and other CPU cores (e.g., the one or more CPU cores 108), for example, such as in dual-core processors or multi-core processors. In some embodiments, the CPU integrated circuit 104 may include a single CPU core 108 as shown in FIG. 2A, or may include a plurality of CPU cores 108_1 to 108_n as shown in FIG. 2B (where n is a natural number greater than 1).

In some embodiments, the main CPU 102 and the CPU core 108 may be connected to the shared memory 106. The shared memory 106 may be a pool of memory devices (e.g., memory chips), and may be internal memory with respect to the main CPU 102, the CPU core 108, or both the main CPU 102 and the CPU core 108. In some embodiments, the shared memory 106 may include a plurality of distributed memory (e.g., memory devices or chips), each connected to a corresponding CPU core and logically shared among the main CPU 102 and the CPU core 108. The SCM 110 may be internal memory with respect to the CPU core 108, and the accelerator memory 116 may be internal memory with respect to the accelerator 114. However, the shared memory 106 may have a larger capacity than those of the SCM 110 and/or the accelerator memory 116 (e.g., 16 KB (kilobyte) or 32 KB).

For example, in various embodiments, the shared memory 106, the SCM 110, and the accelerator memory 116 may each include one or more random access memory (RAM) elements, such as static RAM (SRAM), but the present disclosure is not limited thereto. In various embodiments, the shared memory 106, the SCM 110, and the accelerator memory 116 may include any suitable memory devices, for example, such as SRAM, dynamic RAM (DRAM), relatively high performing non-volatile memory, such as NAND flash memory, Phase Change Memory (PCM), Resistive RAM, Spin-transfer Torque RAM (STTRAM), any suitable memory based on PCM technology, memristor technology, and/or resistive random access memory (ReRAM), and can include, for example, chalcogenides, and/or the like.

In brief overview, in some embodiments, the main CPU 102 may submit commands and corresponding data (e.g., operands) to the shared memory 106. For example, in some embodiments, the main CPU 102 may have a plurality of applications running thereon, and some of the application may transmit commands to be processed by the CPU core 108. The CPU core 108 may retrieve the commands from the shared memory 106, and may store the commands and the corresponding data in the SCM 110. While executing a CPU instruction sequence based on the commands, the CPU core 108 may determine a CPU instruction (e.g., a CPU-acceleration instruction) from among the CPU instruction sequence corresponding to an acceleration workload suitable for processing by the accelerator 114. In this case, the CPU core 108 may transfer (e.g., may move) the instruction (e.g., the CPU-acceleration instruction) to an acceleration instruction queue (AIQ) 112, and may provide corresponding acceleration operands (e.g., data points or values stored in a register file) in the SCM 110 to the accelerator 114 to compute. The results of the compute may be stored in the accelerator memory 116, and may be retrieved by (e.g., read by or sent to) the CPU core 108 as needed or desired to be provided to the shared memory 106 for access by the main CPU 102 (e.g., by the application running thereon).

In some embodiments, the accelerator 114 may be invisible for standard applications that do not require acceleration, although they may still use the CPU core's 108 standard operations (e.g., scalar and vector operations). In some embodiments, applications may access the accelerator 114 through standard libraries, for example, such as BLAS, OpenCL, and the like, and/or through special customized instructions. For example, in some embodiments, the accelerator 114 may be accessed by calling a sub-routine (e.g., a special sub-routine) by the CPU core 108, but the present disclosure is not limited thereto.

FIGS. 2A and 2B are schematic block diagrams of a CPU integrated circuit according to one or more embodiments of the present disclosure.

As shown in FIG. 2A, the CPU integrated circuit 104 may include a single CPU core 108 connected to the accelerator 114 over an AIQ 112, or as shown in FIG. 2B, the CPU integrated circuit 104 may include a plurality of CPU cores 108_1 to 108_n, each connected to the accelerator 114 via a corresponding one of a plurality of AIQs 112_1 to 112_n (where n is a natural number greater than 1). The embodiment illustrated in FIG. 2B may be desired, for example, in a case where a single CPU core may not be able to fully utilize the capabilities and/or bandwidth of the accelerator 114, such that the accelerator 114 may compute or handle acceleration workloads from the plurality of CPU cores 108_1 to 108_n concurrently or substantially simultaneously.

Each of the plurality of CPU cores 108_1 to 108_n may be the same or substantially the same as the CPU core 108, and each of the plurality of AIQs 112_1 to 112_n may be the same or substantially the same as the AIQ 112. Accordingly, the CPU core 108 and the AIQ 112 may be described in more detail hereinafter, and redundant description with respect to the plurality of CPU cores 108_1 to 108_n and the plurality of AIQs 112_1 to 112_n may not be repeated.

As illustrated in FIGS. 2A and 2B, the CPU-acceleration instruction and the corresponding operands read from a scratch memory register file (SRF) of the SCM 110 (e.g., see FIG. 1) may be en-queued into the AIQ 112 by the CPU core 108. In some embodiments, a single CPU-acceleration instruction may be split into multiple micro-operations (μOps) and en-queued into the AIQ 112. The accelerator 114 may de-queue the CPU-acceleration instructions from the AIQ 112, and execute the CPU-acceleration instructions in the order in which they are de-queued from the AIQ 112. For example, the instructions may be de-queued from the AIQ 112 in a first-in-first-out (FIFO) method, but the present disclosure is not limited thereto. In some embodiments, the AIQ 112 may be implemented as a shallow buffer, for example, such as a four-slot flip-flop or the like, but the present disclosure is not limited thereto. The acceleration results are saved in the acceleration memory 116 (e.g., see FIG. 1) embedded in the accelerator 114, for example, as a register file (e.g., a tensor register file) TRF. The CPU core 108 may then read the contents of the register file TRF through special instructions back to its SRF, which will be described in more detail below.

In some embodiments, the AIQ 112 (e.g., each AIQ 112_1 to 112_n) may include a plurality of queues, which may allow for concurrent or substantially simultaneous execution when there are multiple data processing units (e.g., accelerator units) in the accelerator 114. In some embodiments, the plurality of queues of the AIQ 112 (e.g., of each of the AIQs 112_1 to 112_n) may provide a prioritization order of the queues, such that the accelerator 114 may prioritize execution of the CPU-acceleration instructions that are en-queued in a higher priority queue from among the AIQ 112. For example, one of the queues from among the AIQ 112 may be a latency-sensitive queue for those time-critical acceleration operations, whereas another queue from among the AIQ 112 may be a through-put orientated queue for those acceleration operations simply utilizing the increased through-put provided by the accelerator 114. In some embodiments, the execution order of the acceleration operations from any one of the queues of the AIQ 112 may be guaranteed, as they may be de-queued from each of the queues in the order in which they are en-queued (e.g., FIFO), but when the acceleration operations are en-queued in different queues, the execution order thereof may not be guaranteed.

Figure 3:
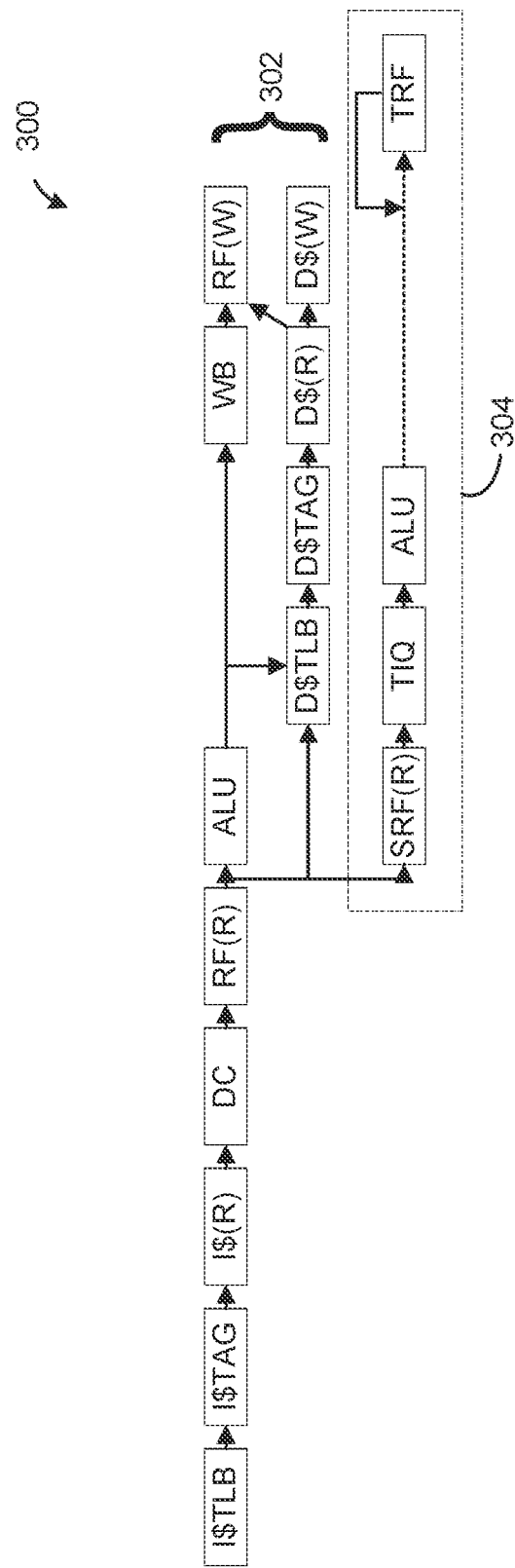
FIG. 3 is a schematic block diagram of a CPU pipeline according to one or more embodiments of the present disclosure.

FIG. 3 is a schematic block diagram of a CPU pipeline according to one or more embodiments.

Referring to FIGS. 1 through 3, a CPU pipeline 300 may include a typical CPU data path 302, for example, such as for typical scalar operations, memory operations, vector operations, and the like. For example, FIG. 3 illustrates a non-limiting example of scalar operations and memory operations as part of the CPU data path 302. However, unlike typical CPU pipelines, the CPU pipeline 300 according to one or more embodiments of the present disclosure may further include a separate acceleration data path 304. For example, FIG. 3 illustrates tensor operations as part of the acceleration data path 304, but the present disclosure is not limited thereto. Each of the data paths 302 and 304 may include a plurality of cycles or stages illustrated as rectangular boxes in FIG. 3, such that one or more operations (e.g., fetch, decode, encode, read register file, compute, write register file, and/or the like) are performed during each cycle or stage. For example, each CPU instruction may go through instruction fetching and instruction decoding by the CPU core 108, and may be dispatched to a suitable one of the data paths based on availability of the data path and type (e.g., scalar, acceleration, and the like) of the CPU instruction.

For example, in some embodiments, an acceleration workload may be encoded into a CPU instruction, fetched, and decoded in a typical manner in one or more cycles or stages (e.g., I$TLB, ISTAG, I$(R), DC, RF(R), and the like)

of the CPU data path 302. However, unlike other CPU instructions, the CPU instructions that are encoded with the acceleration workload (e.g., the CPU-acceleration instructions) are dispatched (e.g., via the AIQ 112) to the integrated accelerator units (e.g., see FIG. 4) of the accelerator 114 in the acceleration data path 304. The CPU-acceleration instruction may be executed in the accelerator units in multiple cycles or stages (e.g., SRF(R), TIQ, ALU, and the like) of the acceleration data path 304, and eventually, the results or partial products of the accelerator units may be committed into the TRF (e.g., the accelerator memory 116). The CPU-acceleration instruction may not cause any recoverable exception in the accelerator units, but the CPU core 108 may handle typical exceptions such as debug, virtual memory trap, and the like normally. Further, there may be minimal impact to the CPU core's 108 other operations (e.g., standard scalar operations), even though the CPU-acceleration instructions are executed over multiple cycles or stages in the acceleration data path 304.

In other words, each CPU instruction from among an instruction sequence executed by the CPU core 108 may be executed through multiple cycles or stages of the CPU pipeline 300. After a CPU instruction passes (e.g., is processed) through multiple cycles or stages of the CPU data path 302 (e.g., fetched and decoded by the CPU core 108), the CPU core 108 may identify an acceleration workload encoded in the CPU instruction, and may transfer (e.g., may send or move) the CPU instruction with the acceleration workload (e.g., the CPU-acceleration instruction) to the AIQ 112 and provide corresponding acceleration operands to the accelerator units in the acceleration data path 304 to process through multiple cycles or stages (e.g., read operands from register file, de-queue CPU-acceleration instruction from AIQ, compute, and the like) of the acceleration data path 304. The results or partial products of the accelerator units in the acceleration data path 304 (which may be computed over a plurality of the cycles or stages) are eventually committed into the TRF, which is illustrated as the last stage of the acceleration data path 304 in FIG. 3, and may be read into the SRF by the CPU core 108 as needed or desired.

As an illustrative example, the instruction sequence may include a first memory load instruction, a second memory load instruction, and a tensor multiply instruction. These instructions of the instruction sequence may be executed sequentially, such that each of the instructions may be executed through multiple cycles or stages (e.g., fetched, decoded, and the like) of the CPU pipeline 300. In this example, as the first memory load instruction and the second memory load instruction do not include any acceleration workloads encoded therein, those instructions may be sent to other data paths of the CPU data path 302 (e.g., the memory operations) to be executed through multiple cycles or stages of the other data paths of the CPU data path 302. On the other hand, after the tensor multiply instruction is fetched and decoded through suitable ones of the cycles or stages (e.g., I$TLB, I$TAG, I$(R), DC, and RF(R) in the example illustrated in FIG. 3) of the CPU data path 302 by the CPU core 108, the accelerator 114 may be invoked to execute the tensor multiply instruction through multiple cycles or stages (e.g., SRF(R), TIQ, ALU, and the like) of the acceleration data path 304, and eventually (e.g., at a last stage), commit the results thereof to the TRF of the accelerator memory 116. For example, in some embodiments, after the CPU-acceleration instruction is fetched and decoded by the CPU core 108, the CPU core 108 may call a special sub-routine to invoke the accelerator 114, but the present disclosure is not limited thereto. Once the tensor multiply instruction is enqueued in the AIQ 112, the CPU core 108 may be free to handle or process other instructions (e.g., scalar operations and/or the like) for its typical CPU data path 302 even during the multiple cycles or stages it takes to complete the tensor multiply instruction by the accelerator 114.

Figure 4:
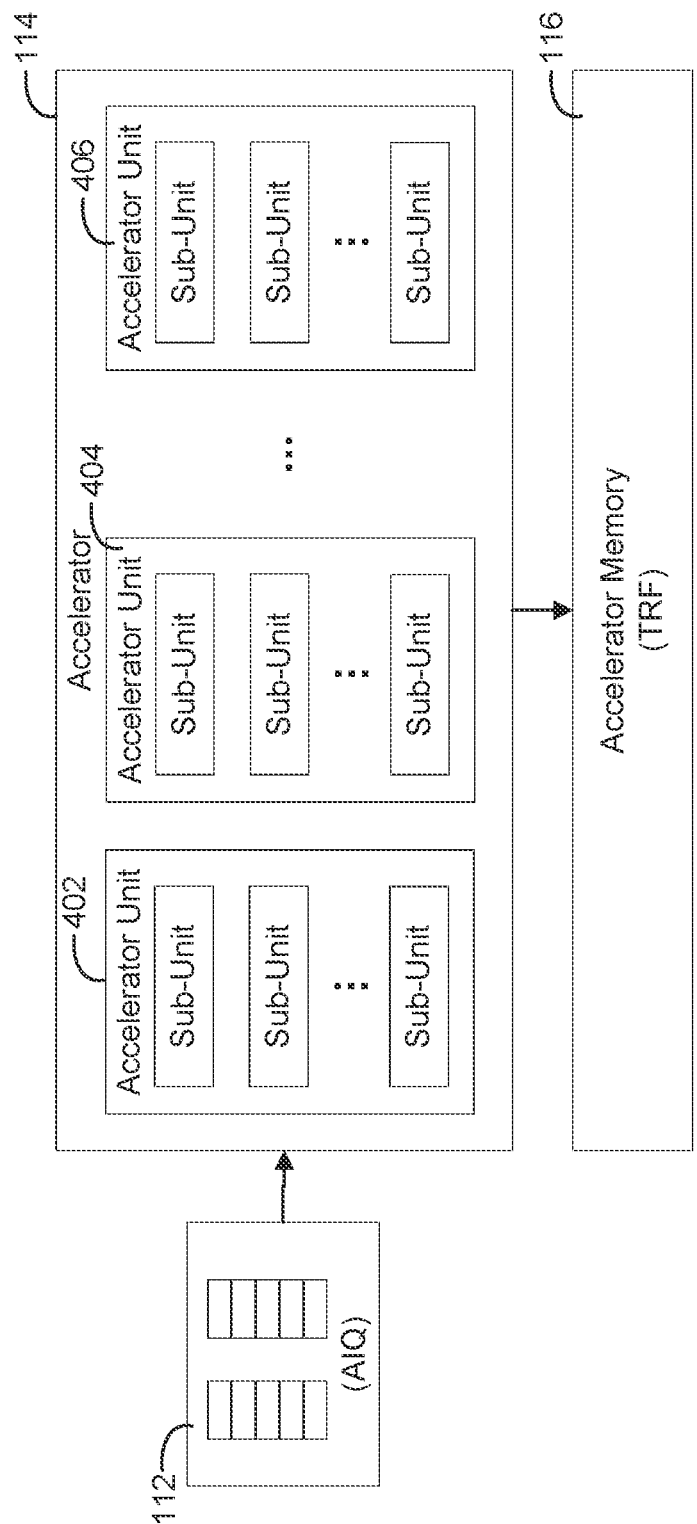
FIG. 4 is a schematic block diagram of an accelerator according to one or more embodiments of the present disclosure.
Figure 5:
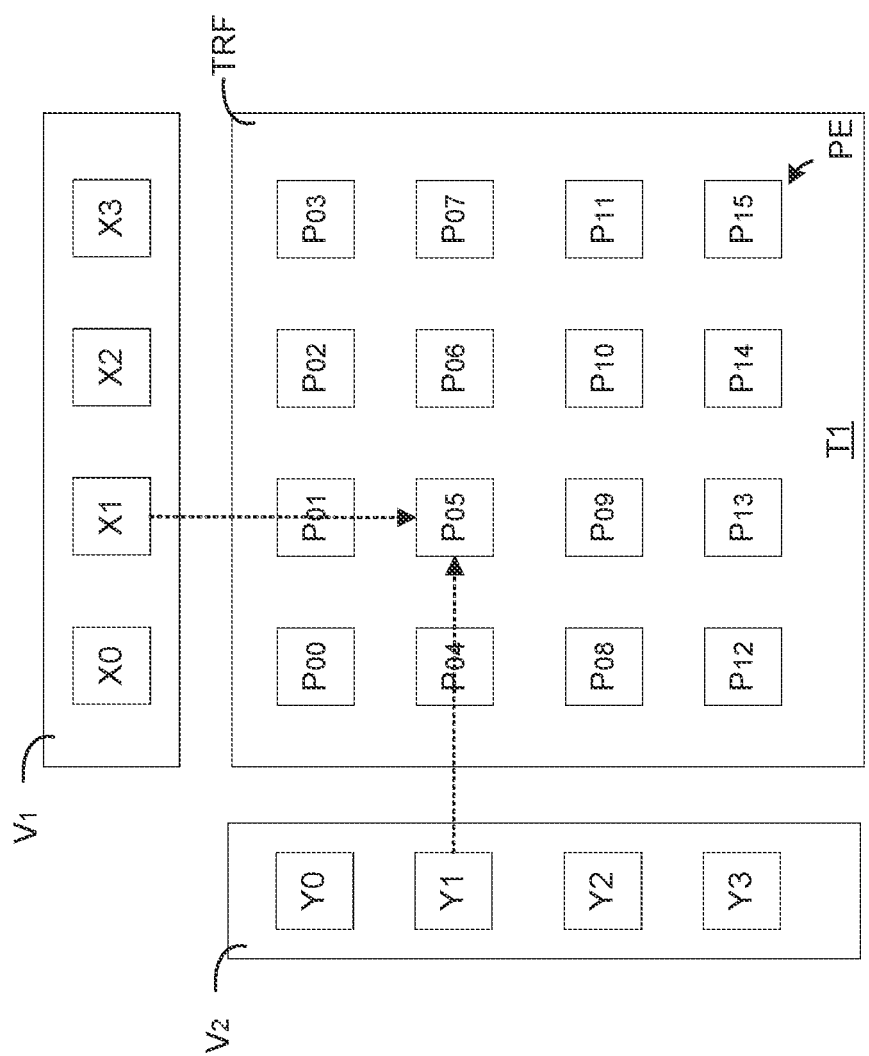
FIG. 5 is a schematic block diagram of an acceleration operation according to one or more embodiments of the present disclosure.
Figure 6:
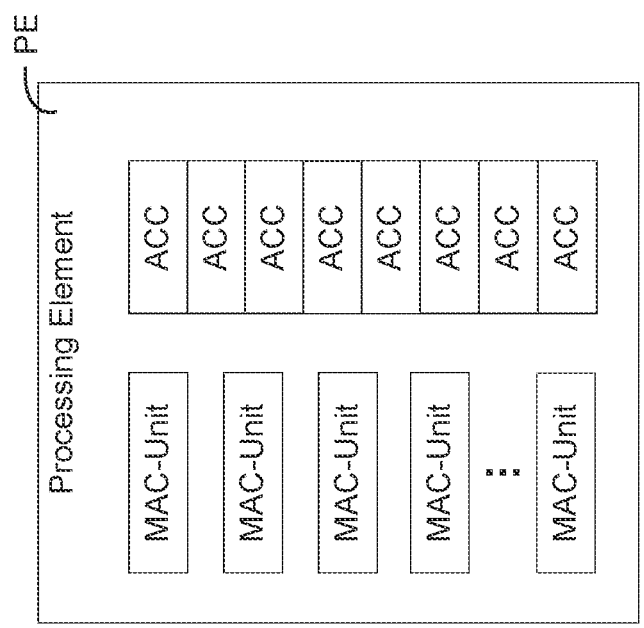
FIG. 6 is a schematic block diagram of a processing element according to one or more embodiments of the present disclosure.

FIG. 4 is a schematic block diagram of an accelerator according to one or more embodiments of the present disclosure. FIG. 5 is a schematic block diagram of an acceleration operation according to one or more embodiments of the present disclosure. FIG. 6 is a schematic block diagram of a processing element according to one or more embodiments of the present disclosure. FIG. 7 illustrates example instructions for acceleration according to one or more embodiments of the present disclosure.

Referring to FIGS. 4 through 6, in some embodiments, the accelerator 114 may include one or more accelerator units 402, 404, . . . , 406. Each of the accelerator units 402, 404, . . . , 406 may include one or more sub-units, for example, such as a special function (SF) sub-unit (e.g., an exponential function (e.g., exp(x)), a sigmoid function (e.g., tanh), GELU, Softmax, and/or the like), a matrix multiplication (MM) sub-unit, and/or the like. Each of the sub-units may include a plurality of processing elements PE, and each of the processing elements PE may include a plurality of MAC-units to perform multiplication and accumulation processes. For example, an MM sub-unit for a 4×4 tensor multiplication operation as illustrated in FIG. 5 may include an array of 16 processing elements $P_{00}$ to $P_{15}$ to compute data along 2 dimensions (e.g., rows and columns). As another example, an MM sub-unit for an 8×8 tensor multiplication operation may include an array of 64 processing elements PE.

FIG. 5 illustrates a non-limiting example of a 4×4 tensor multiplication as the acceleration operation. As illustrated in FIG. 5, the MM sub-unit of the accelerator 114 may be configured to compute the matrix product of two vector registers $V_1$ and $V_2$ of the SCM 110, such that each of the processing elements $P_{00}$ to $P_{15}$ may be configured to perform a multiplication between 2 corresponding operands (e.g., acceleration operands) from among the two vector registers $V_1$ and $V_2$ using an outer product. In some embodiments, the partial or intermediate outputs of each of the processing elements Poo to $P_{15}$ may be accumulated to an accumulation buffer ACC in the acceleration data path 304 to be temporarily stored therein during the multiple cycles or stages that it takes to complete the CPU-acceleration instruction, and eventually, a final result of the compute may be committed to a suitable part (e.g., a register T1) of the accelerator memory 116 (e.g., the TRF), for example, during a last stage of the acceleration data path.

Some example instructions associated with the tensor multiplication operation illustrated in FIG. 5 are illustrated in FIG. 7. Referring to FIGS. 5 and 7, X0 to X3 and Y0 to Y3 are inputs (e.g., acceleration operands) from the vector registers $V_1$ and $V_2$ of the SCM 110, and T1 is a tensor register of the accelerator memory 116 (e.g., the TRF), such that the accelerator memory 116 may contain a plurality of registers (e.g., a plurality of tensor registers). In other words, for illustrative purposes, FIGS. 5 and 7 show an example of a matrix multiplication between the vector registers $V_1$ and $V_2$, such that the results of the computations of each of the processing elements $P_{00}$ to $P_{15}$ over the multiple cycles or stages of the acceleration data path are eventually committed to the TRF of the accelerator memory 116 to form the tensor register T1. As such, each of the processing elements $P_{00}$ to $P_{15}$ computes the product between a corresponding $V_1$ operand and a corresponding $V_2$ operand over multiple cycles or stages. For example, as shown in FIG. 5, the processing element P$_{00}$ may compute a product between X1 and Y1, which may take multiple cycles or stages to complete, and may commit the results (e.g., the final results) thereof in the embedded tensor register T1.

In some embodiments, because the tensor multiplication may be computed over multiple cycles or stages of the acceleration data path 304, partial or intermediate inputs and outputs (I/O) may be computed by each of the processing elements P$_{00}$ to P$_{15}$ during the multiple cycles or stages. In this case, if the partial or intermediate I/Os are provided to and from the tensor register T1 for each of the multiple cycles or stages, the accelerator memory 116 may be overburdened with I/O requests between the stages, which may increase latency of the CPU-acceleration operation. According to one or more embodiments of the present disclosure, rather than committing the partial or intermediate outputs of each of the processing elements PE to the tensor register T1 during each of the cycles or stages of the acceleration data path 304, the processing elements P$_{00}$ to P$_{15}$ may temporarily store the intermediate or partial outputs in the accumulation buffer ACC. Once a final result is calculated, which may include intermediate or partial results output by each of the processing elements P$_{00}$ to P$_{15}$, the final result may be committed to the tensor register T1 (e.g., in the last cycle or stage of the accelerator data path 304).

In some embodiments, the processing element PE (e.g., each of the processing elements P$_{00}$ to P$_{15}$ in FIG. 5) may include the accumulation buffer ACC to store the partial or intermediate outputs. For example, in some embodiments, the accumulation buffer ACC may be implemented as a plurality of flip-flops or registers, but the present disclosure is not limited thereto. In some embodiments, to avoid RAW data hazards, the processing element PE (e.g., each of the processing elements P$_{00}$ to P$_{15}$ in FIG. 5) may include a plurality of accumulation buffers ACC as illustrated in FIG. 6 to store the partial or intermediate outputs. In some embodiments, collecting all accumulation buffers ACC for all of the processing elements P$_{00}$ to P$_{15}$ may form the tensor register T1 of the tensor register file TRF. For example, for an 8×8 array of processing elements PE, the total accumulation buffer ACC size may be 4 KB (e.g., 8×8×16×4=1024× 4=4 KB).

In some embodiments, once the final outputs stored in the accumulation buffers ACC of each of the processing elements PE are committed to the tensor register T1, the data (e.g., the final result) in the tensor register T1 may be moved back to the registers (e.g., the vector registers) of the SCM 110. In the illustrative example, because the tensor register T1 may be larger than a vector register size of the SCM 110, multiple vector registers of the SCM 110 may be used to hold the data from the tensor register T1. In other words, in some embodiments, a slice (e.g., the tensor register T1) of the TRF in the accelerator memory 116, which may contain multiple tensor registers, may be moved from the accelerator memory 116 to N registers (e.g., N vector registers) of the SCM 110, where N is a natural number greater than 1. In some embodiments, once the data in the tensor register T1 is moved to the SCM 110, the data may be moved from the SCM 110 to the shared memory 106 by the CPU core 108 for access by the main CPU 102 (e.g., for access by a requesting application running on the main CPU 102).

Figure 8:
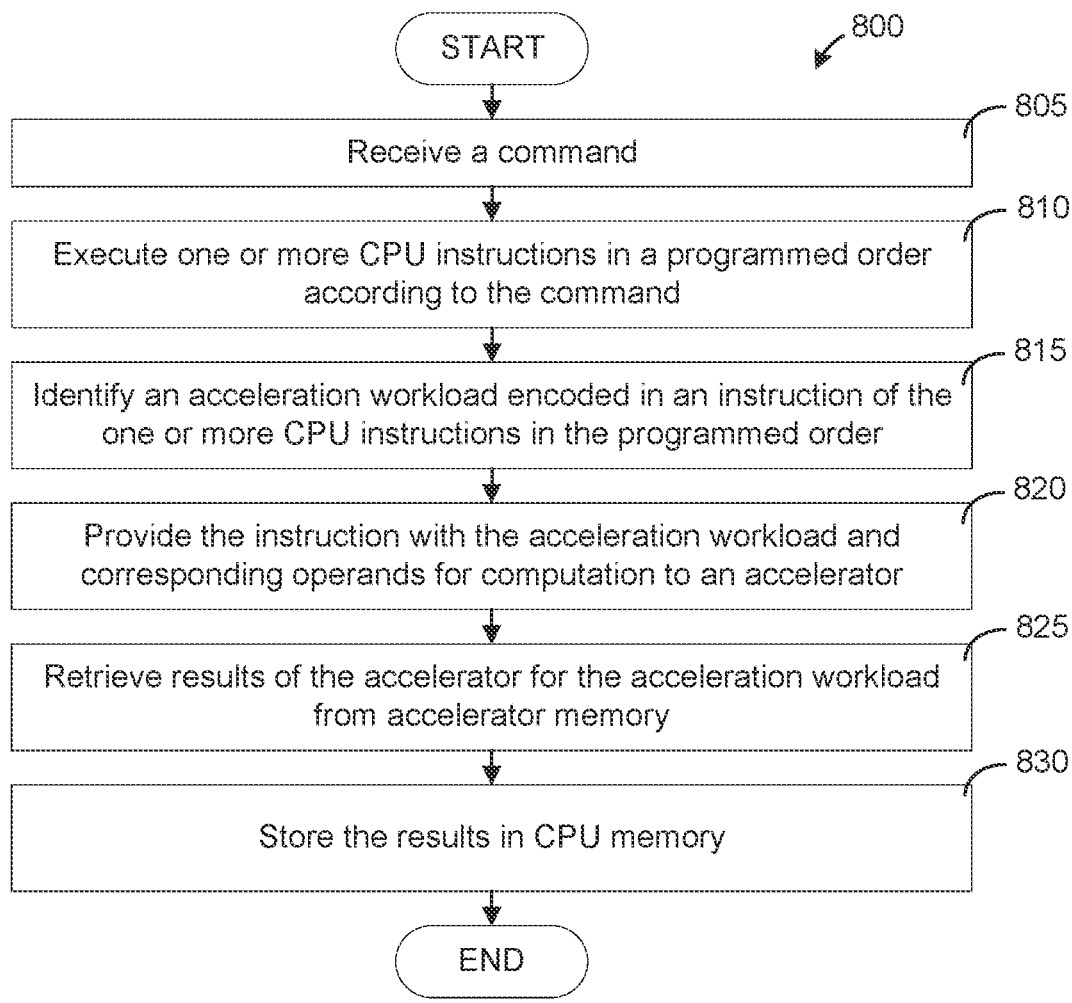
FIG. 8 illustrates a flow chart of a method for accelerating CPU instructions according to one or more embodiments of the present disclosure.

FIG. 8 illustrates a flow chart of a method for accelerating CPU instructions according to one or more embodiments of the present disclosure. However, the present disclosure is not limited to the sequence or number of the operations of the method 800, shown in FIG. 8, and can be altered into any desired sequence or number of operations as recognized by a person having ordinary skill in the art. For example, in some embodiments, the order thereof may vary, some processes thereof may be performed concurrently or sequentially, or the method 800 may include fewer or additional operations.

Referring to FIG. 8, the method 800 may start, and a command may be received at block 805. For example, in some embodiments, the CPU core 108 may receive the command via the shared memory 106 from the main CPU 102 (e.g., from an application running on the main CPU 102). In some embodiments, the CPU core 108 may store the command and corresponding operands retrieved from the shared memory 106 in the SCM 110 (e.g., in a corresponding register of the SRF).

One or more CPU instructions may be executed in a programmed order according to the command at block 810. For example, in some embodiments, to execute the command, the CPU core 108 may execute one or more CPU instructions sequentially in a programmed order. In this case, some of the CPU instructions in the programmed order may contain an acceleration workload encoded therein, while others of the CPU instructions in the programmed order may contain other typical workloads (e.g., scalar workloads, vector workloads, and/or the like).

An acceleration workload encoded in an instruction of the one or more CPU instructions in the programmed order may be identified at block 815. For example, as each of the CPU instructions are fetched and decoded in the programmed order, the CPU core 108 may identify an acceleration workload encoded in at least one of the CPU instructions based on an instruction type. In this case, the instruction with the acceleration workload encoded therein and corresponding operands for computation may be provided to the accelerator at block 820. For example, as described above, in some embodiments, the CPU core 108 may enqueue the instruction with the acceleration workload encoded therein in a suitable AIQ 112, and may provide the corresponding operands stored in the SCM 110 to the accelerator 114 to compute based on the instruction with the acceleration workload enqueued in the AIQ 112.

The results of the accelerator for the acceleration workload may be retrieved from accelerator memory at block 825. For example, in some embodiments, the CPU 108 may be able to determine that an acceleration instruction is executed from viewing the AIQ 112. For example, if the AIQ 112 is empty, then the CPU 108 may determine that all previous instructions enqueued therein have been completed. In some embodiment, in order to ease scheduling requirements, the CPU 108 may assume that the acceleration instruction is completed once it is enqueued in the AIQ. In another example, after a suitable number of cycles or stages of the acceleration data path has elapsed, the CPU 108 may read the results from a corresponding register (e.g., T1 of TRF) of the accelerator memory 116 storing the results. As another example, in some embodiments, a notification may be provided to the CPU 108 when the results are committed to the accelerator memory 116. In another example, in some embodiments, the accelerator 114 may provide the results to the CPU 108 once the results are committed to the accelerator memory 116.

The results may be stored in CPU memory at block 830, and the method 800 may end. For example, in some embodiments, the CPU core 108 may transfer (e.g., may move) the results from the SCM 110 to the shared memory 106, such that the main CPU 102 (e.g., a requesting application running thereon) may access the results from the shared memory 106.

An example method performed by the CPU core 108 according to the operations of blocks 810, 815, and 820 of the method 800 will be described in more detail below with reference to FIG. 9. An example method performed by the accelerator 114 according to the operations of block 820 of the method 800 will be described in more detail below with reference to FIG. 10.

Figure 9:
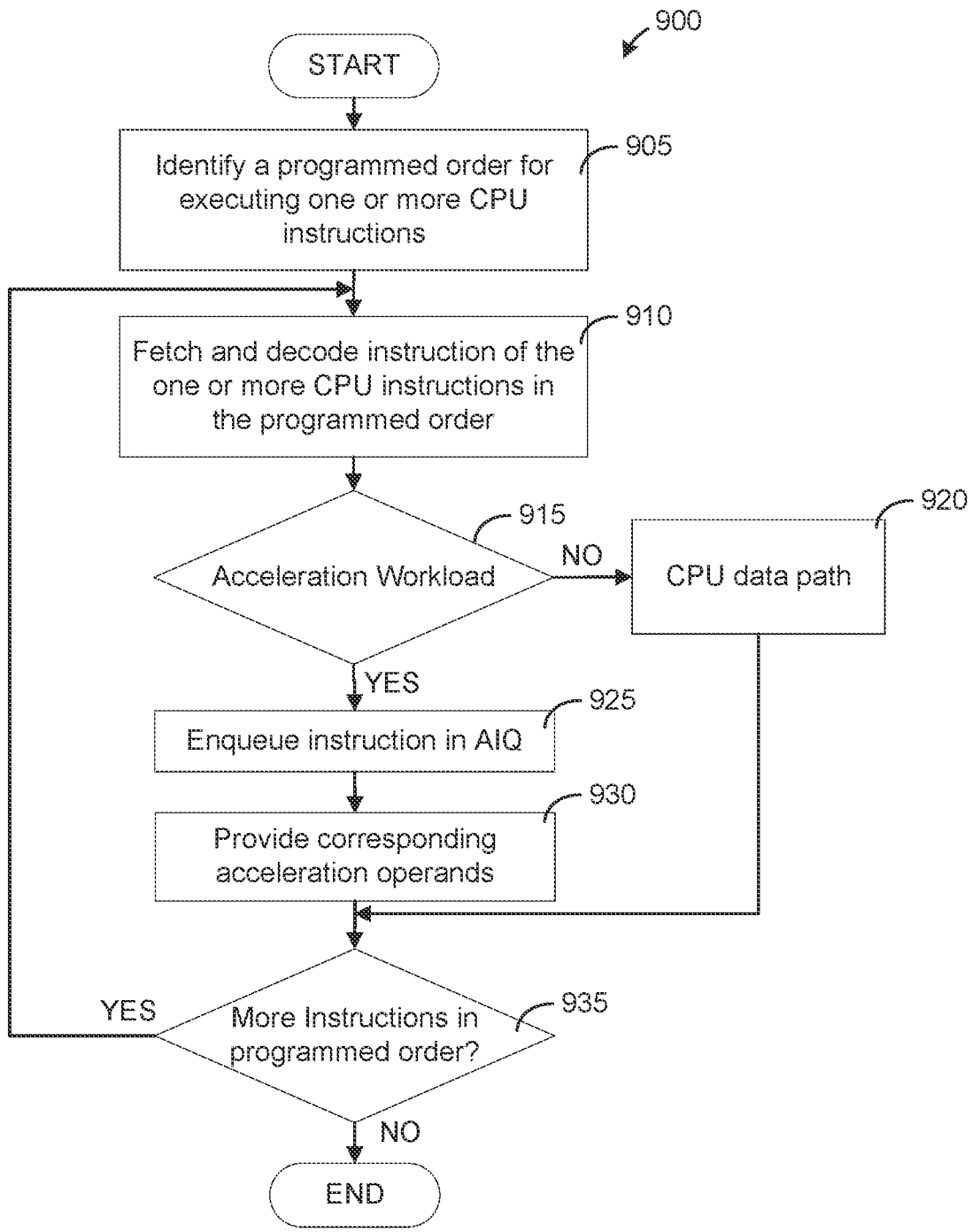
FIG. 9 illustrates a flow chart of a method for selectively invoking an accelerator for acceleration workloads encoded in CPU instructions executed in a programmed order according to one or more embodiments of the present disclosure.

FIG. 9 illustrates a flow chart of a method for selectively invoking an accelerator for acceleration workloads encoded in CPU instructions executed in a programmed order according to one or more embodiments of the present disclosure. However, the present disclosure is not limited to the sequence or number of the operations of the method 900, shown in FIG. 9, and can be altered into any desired sequence or number of operations as recognized by a person having ordinary skill in the art. For example, in some embodiments, the order thereof may vary, some processes thereof may be performed concurrently or sequentially, or the method 900 may include fewer or additional operations.

Referring to FIG. 9, the method 900 may start, and a programmed order for executing one or more CPU instructions may be identified at block 905. For example, in some embodiments, in response to receiving the command as described above with reference to block 805 of the method 800, the CPU core 108 may determine a programmed order of one or more CPU instructions to be executed based on the command.

An instruction of the one or more CPU instructions in the programmed order may be fetched and decoded at block 910. For example, in some embodiments, to execute the one or more CPU instructions in the programmed order at block 810 of the method 800, the CPU instructions may be executed sequentially in the programmed order, such that each of the instructions may be fetched, decoded, and dispatched (e.g., sent to a suitable one of the data paths of the CPU pipeline 300) sequentially. Accordingly, the instruction referred to by block 910 may be any one of the CPU instructions in the programmed order that is currently being fetched and decoded to be dispatched by the CPU core 108.

A determination may be made whether or not the fetched and decoded instruction at block 910 contains an acceleration workload encoded therein at block 915. For example, in some embodiments, the CPU core 108 may determine whether the decoded instruction contains an acceleration workload from an instruction type of the decoded instruction. Based on the determination at block 915, the CPU core 108 may dispatch the decoded instruction to a suitable one of the data paths of the CPU pipeline 300. For example, if the decoded instruction does not contain an acceleration workload (e.g., NO at block 915), the decoded instruction may be dispatched to a suitable one of the CPU data paths 302 (e.g., scalar, memory, and/or the like). On the other hand, if the decoded instruction includes an acceleration workload (e.g., YES at block 915), the decoded instruction may be dispatched to the acceleration data path 304 (e.g., to one or more suitable accelerator units of the accelerator 114).

As such, in some embodiments, in response to determining that the decoded instruction does not contain an acceleration workload (e.g., NO at block 915), the decoded instruction may be dispatched to one or more of the CPU data paths at block 920, and the method 900 may continue at block 935 described in more detail below (e.g., to determine whether or not a next instruction of the one or more CPU instructions in the programmed order contains an acceleration workload).

On the other hand, in some embodiments, in response to determining that the decoded instruction contains an acceleration workload (e.g., YES at block 915), the instruction (e.g., the decoded instruction) may be enqueued in an AIQ at block 925, and corresponding acceleration operands may be provided at block 930. For example, the decoded instruction may be dispatched to the accelerator 114 via the AIQ, and the corresponding acceleration operands of the decoded instruction may be provided to the accelerator 114 to compute when the decoded instruction is dequeued from the AIQ. The operations of the accelerator 114 based on the operations of blocks 925 and 930 of the method 900 will be described in more detail below with reference to FIG. 10.

Still referring to FIG. 9, after dispatching the decoded instruction (e.g., to either the CPU data path at block 920 or the accelerator data path at block 925), the method 900 may continue at block 935 to determine whether or not there are more instructions in the programmed order. If so (e.g., YES at block 935), the method 900 may repeat at block 910, such that the next instruction in the programmed order is fetched, decoded, and dispatched as described above. On the other hand, if there are no more instructions in the programmed order (e.g., NO at block 935), the method 900 may end. In this case, if any of the instructions in the programmed order was dispatched to the accelerator 114 in the method 900, the CPU core 108 may subsequently retrieve (e.g., read or be provided with) the results of the accelerator 114 from the accelerator memory at block 825 of the method 800, and may store the results in the CPU memory (e.g., the shared memory 106) at block 830 of the method 800 as described above.

Figure 10:
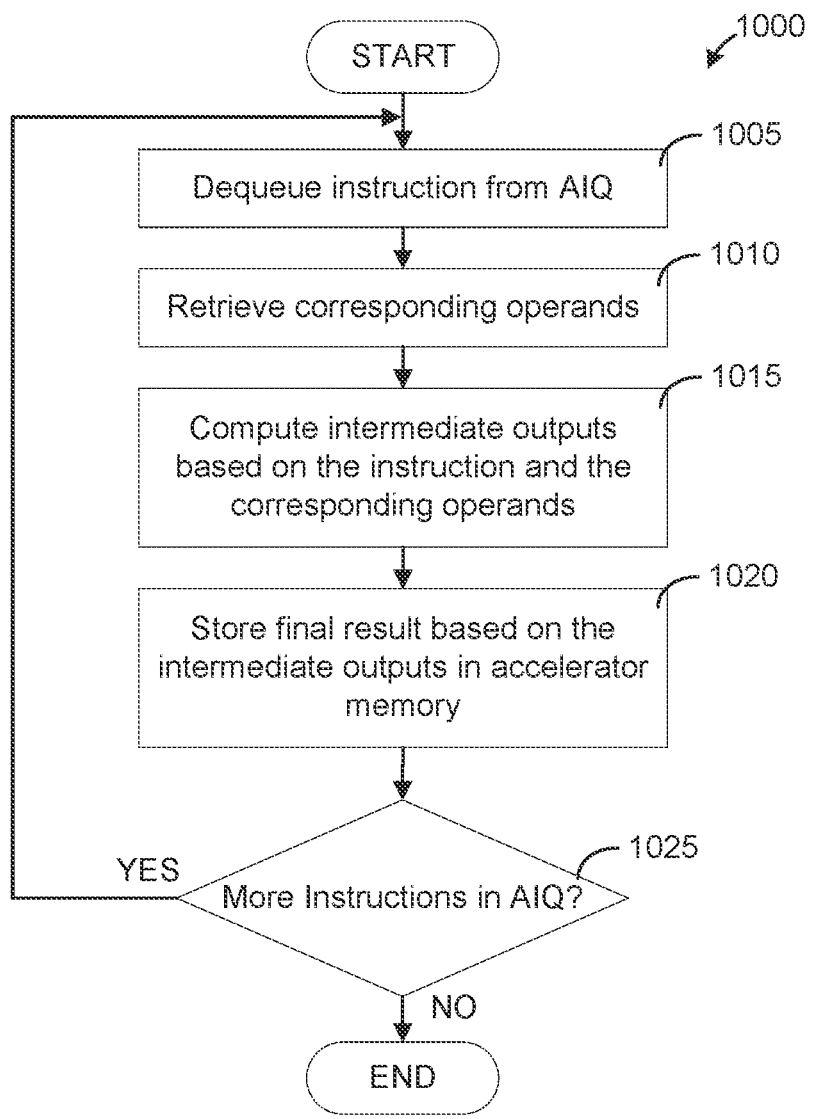
FIG. 10 illustrates a flow chart of a method for processing acceleration workloads from an acceleration instruction queue according to one or more embodiments of the present disclosure.

FIG. 10 illustrates a flow chart of a method for processing acceleration workloads from an acceleration instruction queue according to one or more embodiments of the present disclosure. However, the present disclosure is not limited to the sequence or number of the operations of the method 1000, shown in FIG. 10, and can be altered into any desired sequence or number of operations as recognized by a person having ordinary skill in the art. For example, in some embodiments, the order thereof may vary, some processes thereof may be performed concurrently or sequentially, or the method 1000 may include fewer or additional operations.

Referring to FIG. 10, the method 1000 may start, and an instruction (e.g., a CPU instruction) may be dequeued from the AIQ at block 1005, and corresponding operands may be retrieved (e.g., read or provided to) at block 1010. For example, in some embodiments, the accelerator 114 (or a resource management agent therein) may dequeue the instructions in the AIQ in the order in which they are received (e.g., FIFO), and the operands may be data or values stored in the SCM 110 that correspond to the dequeued instruction and read by or provided to the accelerator 116 to compute the acceleration workload encoded in the dequeued instruction (e.g., the CPU instruction).

Intermediate outputs may be computed based on the instruction and the corresponding operands at block 1015, and a final result based on the intermediate outputs may be stored in accelerator memory 116 at block 1020. For example, in some embodiments, the processing elements PE of the accelerator 114 may compute the intermediate outputs over a plurality of cycles or stages of the accelerator data path, and a collection of all of the final outputs of each of the processing elements PE collected over the plurality of cycles or stages may correspond to the final result. In some embodiments, the intermediate outputs and the final outputs of each of the processing elements PE computed over the plurality of cycles or stages may first be temporarily stored in an accumulation buffer ACC until the final result is computed, and in a last stage of the accelerator data path, the final result may be committed to the accelerator memory (e.g., to a register file therein) at block 1020.

A determination may be made whether or not there are more instructions enqueued in the AIQ at block 1025. If so (e.g., YES at block 1025), the method 1000 may repeat from block 1005 until all of the instructions in the AIQ are dequeued, computed, and stored sequentially (e.g., one at a time) as described above. On the other hand, if there are no more instructions queued in the AIQ (e.g., NO at block 1025), the method 1000 may end. As described above with reference to blocks 825 and 830 of the method 800 of FIG. 8, in some embodiments, the CPU 108 may retrieve the results (e.g., the final result) from the accelerator memory 114 when appropriate (e.g., after the multiple cycles or stages of the accelerator data path are completed), and may store the results in CPU memory (e.g., the shared memory 106) to be accessed by the main CPU 102 (e.g., a requesting application running thereon).

According to one or more embodiments of the present disclosure as described above, a CPU instruction-based neural network accelerator may be provided to improve computing capacity, programmability, and power efficiency, for example, such as for model training and/or inference. However, the present disclosure is not limited thereto, and additional aspects and features may be apparent from the embodiments described above, or may be learned by practicing one or more of the presented embodiments of the present disclosure.

The foregoing is illustrative of some embodiments of the present disclosure, and is not to be construed as limiting thereof. When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

The electronic or electric devices and/or any other relevant devices or components according to embodiments of the present disclosure described herein (e.g., the main CPU, the CPU core, the accelerator, the various units of the accelerator, and the like) may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. An integrated circuit comprising:
    a central processing unit (CPU) core;
    an accelerator; and
    an acceleration instruction queue connected to the CPU core and the accelerator,
    wherein the CPU core is configured to:
        fetch and decode one or more instructions from among an instruction sequence in a programmed order, the one or more instructions comprising an acceleration workload for the accelerator and a CPU workload for the CPU core;
        determine a first instruction from among the one or more instructions containing the acceleration workload encoded therein based on an instruction type of the first instruction indicating the acceleration workload;
        queue the first instruction containing the acceleration workload encoded therein in the acceleration instruction queue;
        determine a second instruction from among the one or more instructions containing the CPU workload therein based on an instruction type of the second instruction indicating the CPU workload; and
        dispatch the second instruction to a CPU data path for the CPU core, and
    wherein the instruction type indicating the acceleration workload comprises one or more tensor operations, and the instruction type indicating the CPU workload comprises at least one of a scalar workload, a vector workload, or a memory workload.

2. The integrated circuit of claim 1, wherein the accelerator is configured to:
    dequeue the first instruction containing the acceleration workload from the acceleration instruction queue;
    receive operands associated with the acceleration workload from scratch memory of the CPU core; and
    compute a result based on the operands and the dequeued first instruction.

3. The integrated circuit of claim 2, wherein the accelerator is configured to dequeue instructions from the acceleration instruction queue in a first-in-first-out method.

4. The integrated circuit of claim 2, wherein the accelerator is further configured to store the result in embedded memory of the accelerator.

5. The integrated circuit of claim 4, wherein the CPU core, the accelerator, the scratch memory, and the embedded memory are integrated on the same chip as each other.

6. The integrated circuit of claim 4, wherein the CPU core is configured to retrieve the result from the embedded memory of the accelerator, and store the result in the scratch memory of the CPU core.

7. The integrated circuit of claim 1, wherein the accelerator instruction queue comprises a plurality of instruction queues defining different priorities from each other for the accelerator.

8. A computing system comprising:
    an accelerator;
    one or more processors integrated with the accelerator in the same integrated circuit; and
    memory comprising instructions stored thereon that, when executed by the one or more processors, cause the one or more processors to:
        identify a programmed order for executing one or more CPU instructions, the one or more CPU instructions comprising an acceleration workload for the accelerator and a CPU workload from the one or more processors; and
        execute the one or more CPU instructions according to the programmed order,
    wherein to execute the one or more CPU instructions, the instructions cause the one or more processors to:
        fetch and decode a first instruction in the programmed order from among the one or more CPU instructions;
        dispatch the decoded first instruction to an accelerator data path from among a CPU pipeline based on an instruction type of the first instruction indicating the acceleration workload;
        fetch and decode a second instruction in the programmed order from among the one or more CPU instructions; and
        dispatch the decoded second instruction to a CPU data path from among the CPU pipeline based on an instruction type of the second instruction indicating the CPU workload, and
    wherein the instruction type indicating the acceleration workload comprises one or more tensor operations, and the instruction type indicating the CPU workload comprises at least one of a scalar workload, a vector workload, or a memory workload.

9. The computing system of claim 8, wherein the first instruction comprises an accelerator workload encoded therein to be dispatched to the accelerator data path, and wherein the instructions further cause the one or more processors to:
   enqueue the first instruction in an acceleration instruction queue; and
   provide corresponding operands to the accelerator for compute based on the first instruction.

10. The computing system of claim 9, wherein the accelerator is configured to:
   dequeue the first instruction from the acceleration instruction queue;
   compute a result based on the corresponding operands and the first instruction dequeued from the acceleration instruction queue; and
   store the result in embedded memory of the accelerator.

11. The computing system of claim 10, wherein the accelerator is configured to dequeue instructions from the acceleration instruction queue in a first-in-first-out method.

12. The computing system of claim 10, wherein the instructions further cause the one or more processors to:
   retrieve the result from the embedded memory of the accelerator; and
   store the result in scratch memory.

13. The computing system of claim 12, wherein the accelerator, the one or more processors, the embedded memory, and the scratch memory are integrated in the same integrated circuit.

14. A method for accelerating instructions, comprising:
   identifying, by one or more processors, a programmed order for executing one or more instructions, the one or more instructions comprising an acceleration workload and a CPU workload;
   determining, by the one or more processors, the acceleration workload encoded in a first instruction of the one or more instructions in the programmed order based on an instruction type of the first instruction indicating the acceleration workload;
   dispatching, by the one or more processors, the first instruction to an accelerator data path from among a plurality of data paths of a CPU pipeline based on the determining that the acceleration workload is encoded in the first instruction;
   determining, by the one or more processors, the CPU workload encoded in a second instruction of the one or more instructions in the programmed order based on an instruction type of the second instruction indicating the CPU workload; and
   dispatching, by the one or more processors, the second instruction to a CPU data path from among the plurality of data paths of the CPU pipeline based on the determining that the CPU workload is encoded in the second instruction,
   wherein the instruction type indicating the acceleration workload comprises one or more tensor operations, and the instruction type indicating the CPU workload comprises at least one of a scalar workload, a vector workload, or a memory workload.

15. The method of claim 14, wherein the dispatching of the first instruction comprises:
   enqueueing, by the one or more processors, the first instruction in an acceleration instruction queue; and
   providing, by the one or more processors, corresponding operands to the accelerator data path for compute based on the first instruction.

16. The method of claim 15, wherein the accelerator data path comprises an accelerator integrated with the one or more processors in the same integrated circuit, and the method further comprises:
   dequeuing, by the accelerator, the first instruction from the acceleration instruction queue;
   computing, by the accelerator, a result based on the corresponding operands and the first instruction dequeued from the acceleration instruction queue; and
   storing, by the accelerator, the result in embedded memory of the accelerator.

17. The method of claim 16, wherein the accelerator is configured to dequeue instructions from the acceleration instruction queue in a first-in-first-out method.

18. The method of claim 16, further comprising:
   retrieving, by the one or more processors, the result from the embedded memory of the accelerator; and
   storing, by the one or more processors, the result in scratch memory of the one or more processors.

19. The method of claim 16, wherein the accelerator and the one or more processors are co-processors or multi-processors of the same integrated circuit.

* * * * *